Feb. 20, 1934.  A. D. WHIDDEN  1,947,631

FORK FOR WHEELED VEHICLES

Filed Oct. 11, 1932

INVENTOR
Arthur D. Whidden

Patented Feb. 20, 1934

1,947,631

UNITED STATES PATENT OFFICE 1,947,631

FORK FOR WHEELED VEHICLES

Arthur D. Whidden, Elyria, Ohio

Application October 11, 1932. Serial No. 637,235

2 Claims. (Cl. 208—96)

My improvement relates to the fork for velocipedes or other wheeled vehicles and consists of an all-tube construction of lighter weight and greater strength.

As now generally made, the crown of the fork is of malleable iron, the stem is of tubular construction, inserted into the top of the crown which is held there until brazed by pinning. The forked sides or legs are tubular, elliptically formed, and are pinned onto the crown stubs. All these parts are then brazed together after which the fork must be straightened and ground because of the irregularities after brazing. This gives a high cost of production.

To simplify the shopwork, reduce the cost and make a stronger and better fork, my invention consists of tubular construction, a fork made with a tubular stem butt-welded to a single tube fork member.

In order to accomplish my purpose, to make my improved fork stronger than the fork as now generally made, my improvement further consists of the introduction of a central rod or reinforcing member within the tubular fork member at the crown under the stem.

Tubings for bicycle forks and frames and the like are generally made from seamless drawn tubing of steel or other metal of high elasticity and without my reinforcement the forked tube member would have a tendency to change form under strain.

By welding the reinforcing rod into the tubular fork member and the stem member onto the tubular fork member at the same time, a rigid joint is made, which in effect is stronger and more durable than the casting now generally used.

Figure 1:
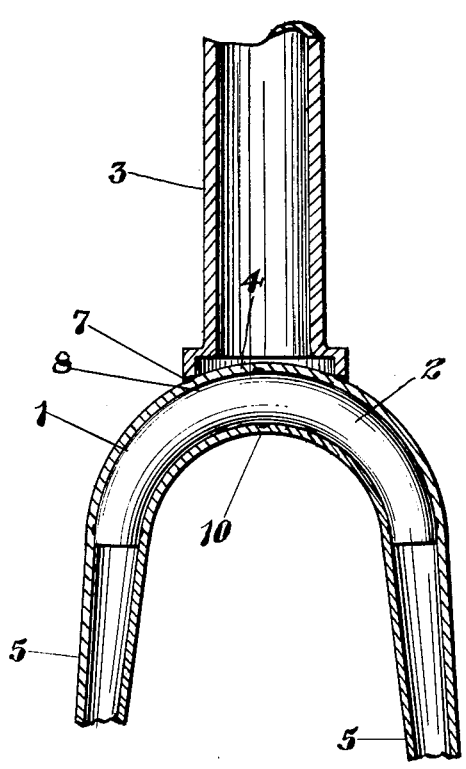
Fig. 1 is a front view of the fork.
Figure 2:
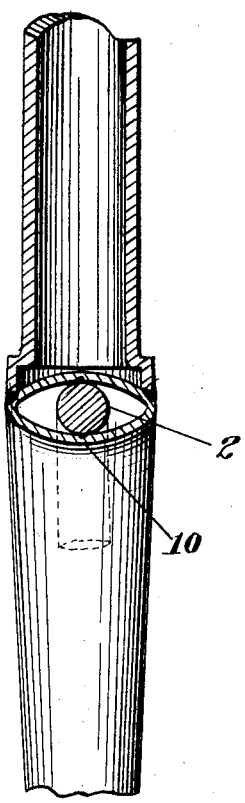
Fig. 2 is a side view of the fork.
Figure 3:
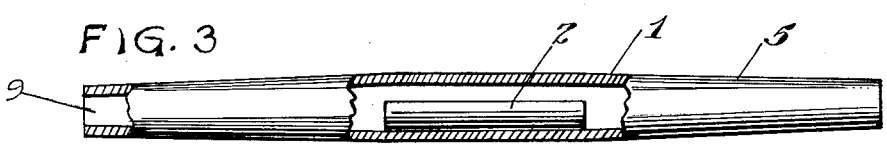
Fig. 3 is a side view and section of the forked tube before compression.
Figure 4:
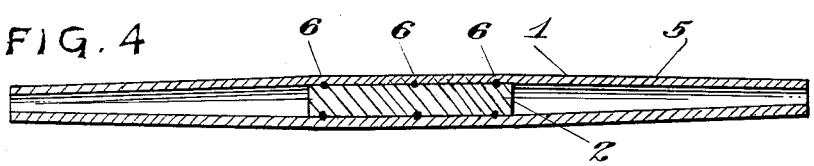
Fig. 4 is a side view and section of the forked tube after compression.

A straight tube 1 is swedged at both ends to conical form 5, leaving an opening 9 at each end large enough to admit freely a rod 2 of standard diameter.

The rod 2 is centered in the tube 1.

The tube 1 is then flattened down on the reinforcing member (rod) 2, taking an oval or elliptical form and gripping the reinforcing member 2 tightly.

The reinforcing member 2 is then spot-welded at 6.

The tube 1 is then bent to the form shown in Fig. 1.

The stem 3 is butt-welded to the crown 4 at 7, making a solid joint between the stem 3 and the tube 1 and making a solid central portion of fork from the stem 3 to the bottom 10 of the fork crown.

The above description and drawing apply particularly to a velocipede but are equally applicable to tubular constructions of forks for bicycles, casters, wheeled chairs, trucks or other wheeled vehicles.

I claim:

1. In a vehicle wheel support of the class described, a tubular fork of oval section at the crown, sides of oval section tapering from the said crown portion to smaller sections at the ends thereof, a reinforcing member centrally disposed within the said central portion of the said fork crown, and a stem on center line of fork, the said fork crown the said reinforcing member and the said stem welded together to form a rigid construction of the central crown portion of the said fork.

2. In a vehicle wheel support of the class described, a tubular fork of oval section at the crown, sides of oval section tapering from the said crown portion to smaller openings at the ends thereof, a reinforcing member centrally disposed within the said crown portion of the fork, the said reinforcing member of circular cross-section capable of admittance in the opening, either one of the said openings in the ends of the said sides, and a stem member, the said fork member and the said reinforcing member welded together to form a rigid construction of the said crown portion of the said fork.

ARTHUR D. WHIDDEN.